Sept. 5, 1933.    K. SCHOENE    1,925,464
GUIDING MEANS FOR ANNULAR VALVES
Filed June 19, 1931
Fig. 1
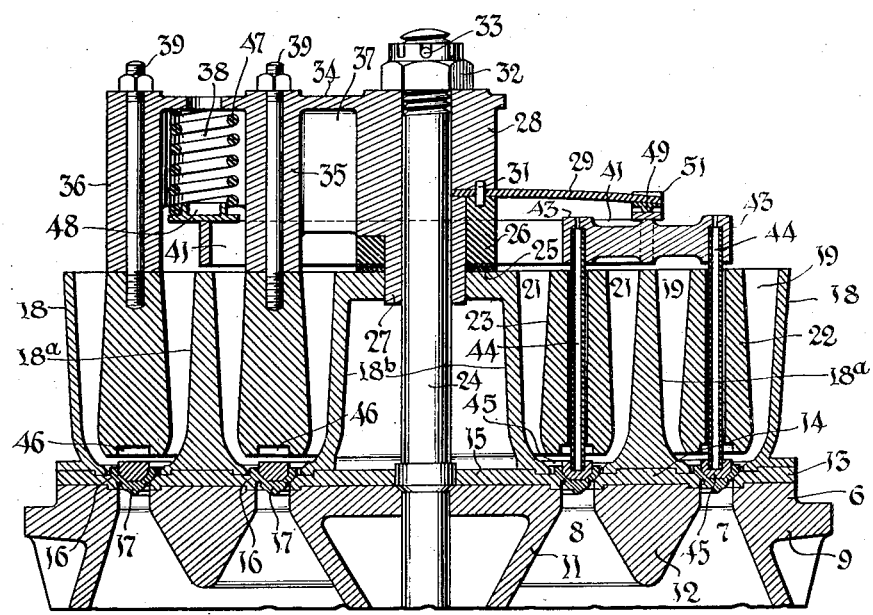
Fig. 2
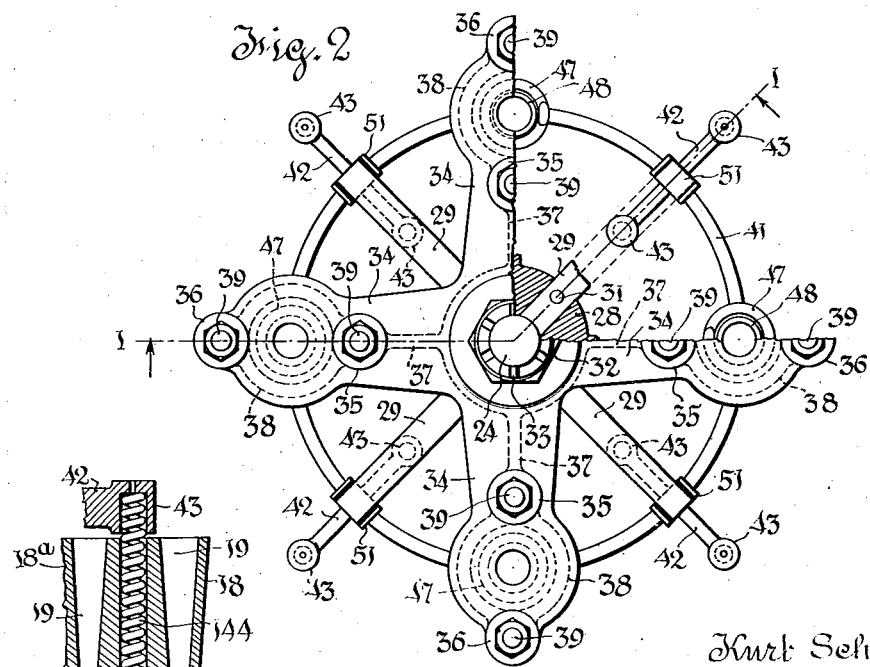
Fig. 3
Inventor
Kurt Schoene
By
Dodge and Sons
Attorneys Patented Sept. 5, 1933

1,925,464

UNITED STATES PATENT OFFICE 1,925,464

GUIDING MEANS FOR ANNULAR VALVES

Kurt Schoene, Hamburg, Germany

Application June 19, 1931, Serial No. 545,590, and in Germany October 15, 1930

9 Claims. (Cl. 251—144)

This invention relates to valves, and particularly to discharge valves for liquid pumps.

In pumps of this class which operate at relatively high speed against relatively high heads marked power economies can be effected by the use of so-called nozzle-shaped discharge passages designed to minimize the changes of direction of flow through the valve and avoid sudden changes of cross sectional areas of the water passages.

One line of development intended to take advantage of these hydraulic principles involves the use of pressure actuated discharge valves mounted directly in the head and taking the form of concentric annuli. In valves of this type there is an annular guard ring which overlies each valve, and in prior constructions these guard rings have been so formed as to house the springs which seat the valve. This construction imposes certain limitations on the design of the valve which it is the purpose of the present invention to avoid.

Generally stated, it has been necessary to make guard rings for the valves unduly wide in order to house springs of the necessary size, with the result that the overall width of the valve with reference to the overall width of the seating area of the valve seat, has been unfavorable to the best hydraulic performance. The present invention relates to a guiding mechanism which removes these limitations.

In connection with the illustration of the invention in the present application, I show a design of the valve and valve seat which forms the subject matter of my companion application Serial No. 545,591 filed June 19, 1931. Consequently, the proportions of the valve and seat proper are not claimed herein.

The preferred embodiment of the invention is illustrated in the accompanying drawing, in which,—

Fig. 1 is a vertical section through the valve cage and valve mechanism, on the line 1—1 of Fig. 2.

Fig. 2 is a plan view of the valve guiding mechanism, partly broken away, to show certain details of construction.

Fig. 3 is a fragmentary view similar to a portion of Fig. 1, showing a modified construction.

In the drawing, 6 represents the valve cage which is preferably cast in one piece and which is formed with two concentric substantially continuous water discharge ports 7 and 8.

Generally stated, the valve cage can be regarded as comprising an outer annular portion 9 and central hub portion 11 and an intervening annular portion 12 connected together by slender radial webs, which do not appear in the drawing, and so formed as to produce the water passages 7 and 8 which taper upwardly to the valve seat as shown.

Mounted on the cage is a valve seat element made up of an outer annulus 13, an inner annulus 14, and a central disk 15, which are formed with conical seats, indicated at 16, for the annular valves 17 (two of which are shown). The form of these valves 17 is not a feature of the present invention. Certain characteristics thereof are claimed in my prior application Serial No. 476,657, filed August 20, 1930, and other characteristics are covered by my copending application above identified.

Overlying the valve seat members 13, 14 and 15 are the three discharge nozzle forming castings 18, 18a, 18b, the members 18 and 18a being fixed to the seat members 13, 14 and 15 by screws, which do not appear in the drawing. The castings 18, 18a and 18b are so formed as to provide two flaring discharge passages 19 for the outer one of the two valves 17, and two similar flaring discharge passages 21 for the inner one of the two valves 17. These passages are isolated from each other and partially defined by the guard rings 22 and 23 which overlie respective valves 17 and which are connected by the studs 39 to the arms 34 and the hub 28. The effect is that the passages 19 and 21 are continuous annular passages.

Fixed in the cage 6 at the center is an upstanding rod 24 which passes through the disk 15 and the casting 18b and projects above the latter. Immediately above the casting 18b are a plurality of thin washers or shims 25, and above these washers is a castellated filler piece 26 which encircles a sleeve-like portion 27 on a hub 28. Between the hub 28 and the castellated filler piece 26 are received a plurality of radial leaf springs 29 (four being shown) which are held in place by dowel pins 31 received partly in the filler piece 26 and partly in the hub 28. A castellated nut 32 holds the parts in assembled relation. The nut is pinned as indicated at 33.

The hub 28 carries heavy radial arms 34, four being shown, arranged to alternate with the leaf springs 29. Each of these arms is provided with two heavy bosses 35 and 36. The bosses 35 are connected to the hub 28 by webs 37 and the bosses 35 and 36 are connected by annular webs 38 which form pockets for springs, later to be described. The bosses 35 and 36 are connected respectively to the guard rings 23 and 22 by the studs 39, and thus support and position the guard rings.

The nut 32 forces the hub 28 and its connected parts downward upon the casting 18b, and this in turn confines the valve seat member 15 to close contact with the valve cage 6. The members 26 and 28 clamp the ends of the spring 29 between them so that the inner ends of the radial springs are rigidly supported.

Concentric with the rod 24 is a vertically reciprocable yoke or ring 41. This has arms 42 which extend radially inward and outward therefrom, and which are formed at their ends with hubs 43. Retained in these hubs 43 are vertical tubular thrust members 44 which extend downwardly through passages formed in the valve guards 22 and 23 to receive them. At their lower ends the tubes 44 are inserted in sockets in thrust rings 45 which are seated in grooves in the upper faces or backs of the annular valves 17. The members 45 are received in grooves 46 formed in the lower faces of the guard rings 22 and 23. The ring 41 is urged in a valve-closing direction by a plurality of coil springs 47 (four being shown). These springs are housed in the pockets formed by the webs 38 and react downwardly against spring seats 48 which engage the upper side of the ring 41.

The ring 41 is rather freely guided by the tubular stems 44 and also by the leaf springs 29 which rest on rockers 49. The rockers are confined to spring seats 51 formed on the ring 41 at its junction with each of the arms 42.

The structure above defined has many advantages. All the parts may be readily dismounted. The valve seats are formed on separate members which can readily be replaced. The valve guiding and guarding mechanism imposes no limitation on the form of the passages 19 and 21 and particularly on the form of the guard rings 22 and 23. The valve is suitably supported and guided and yet may be made of minimum dimensions. The valve spring structure is wholly external to the guard rings. This permits the attainment of the desired heavy seating action, without requiring the use of heavily stressed small springs.

Another advantage is that the springs may be made of such large section that in the event of failure pieces of the spring will not enter the space between the valve and seat and occasion serious damage. This has been a serious difficulty with prior structures.

Various modifications are possible within the broad scope of the invention. For example, as indicated in Fig. 3, heavy coil springs 144 may, in certain cases, be substituted for the tubes 44. The specific embodiments illustrated are chosen for purposes of explanation, and departures from these to meet particular conditions are contemplated.

What is claimed is:—

1. The combination with an annular valve, valve seat and fixed diffusing guard ring overlying the valve and limiting the upward motion thereof, of thrust members extending through the guard ring and engaging said valve, means beyond said guard ring for supporting and guiding said thrust members, and spring means external to the guard ring and reacting through said thrust members upon the valve.

2. The combination with an annular valve, valve seat and guard ring overlying the valve and limiting the upward motion thereof, of thrust members guided in the guard ring; a yoke engaging said thrust members; and yielding means for guiding said yoke, and reacting through said yoke and thrust members to urge said valve in a closing direction.

3. The combination with an annular valve, valve seat and guard ring overlying the valve and limiting the upward motion thereof, of thrust members passing through the guard ring and in thrust relation with said valve; a yoke beyond the guard ring and engaging said thrust members; leaf springs guiding said yoke; and coil springs urging said yoke in a valve closing direction.

4. The combination of an annular valve, a seat therefor; means forming two gradually flaring annular diffusing passages leading from said valve, said means including a fixed guard ring which separates said passages and is engaged by the valve when open; guiding means for said valve including a plurality of thrust members extending through said guard ring and a movable support for said members beyond said ring; and spring means reacting through said guiding means and urging said valve in a closing direction.

5. The combination of an annular valve, a seat therefor; means forming two gradually flaring annular diffusing passages leading from said valve, said means including a fixed guard ring which separates said passages and is engaged by the valve when open; guiding means for said valve including a thrust ring engaging the valve and a plurality of thrust members extending through said guard ring and engaging said thrust ring; and spring means reacting through said guiding means and urging said valve in a closing direction.

6. A discharge valve structure for cylinder pumps comprising a valve cage having an annular port of tapering cross section; members provided with annular valve seats and supported by said cage; a discharge-nozzle structure overlying said valve seat members and having two flaring annular nozzle passages for receiving fluid flowing through the annular port, said structure including a guard ring which separates said passages and overlies the annular port; means for holding said parts in assembled relation; and an annular valve coacting with said seat members, and limited in its opening movements by said guard ring.

7. A discharge valve structure for cylinder pumps comprising a valve cage having an annular port of tapering cross section; members provided with annular valve seats and supported by said cage; a discharge-nozzle structure overlying said valve seat members and having two flaring annular nozzle passages for receiving fluid flowing through the annular port, said structure including a guard ring which separates said passages and overlies the annular port; means for holding said parts in assembled relation; an annular valve coacting with said seat members, and limited in its opening movements by said guard ring; thrust members passing through said guard ring and in thrust relation with said valve; a yoke in thrust relation with said thrust members; and yielding means reacting against said yoke to urge the valve in a closing direction.

8. The combination with an annular valve, valve seat and guard ring overlying the valve and limiting the upward motion thereof, of longitudinally compressible thrust members guided in the guard ring; a yoke engaging said thrust members; and yielding means for guiding said yoke, and reacting through said yoke and thrust members to urge said valve in a closing direction.

9. The combination of an annular valve, a seat therefor; means forming two gradually flaring annular diffusing passages leading from said valve, said means including a guard ring which separates said passages and is engaged by the valve when open; guiding means for said valve including a thrust ring engaging the valve and a plurality of longitudinally compressible thrust members extending through said guard ring and engaging said thrust ring; and spring means reacting through said guiding means and urging said valve in a closing direction.

KURT SCHOENE.